Dec. 1, 1931.  W. J. SMITH ET AL  1,834,906
UNIVERSAL JOINT
Filed Feb. 27, 1929   2 Sheets-Sheet 1
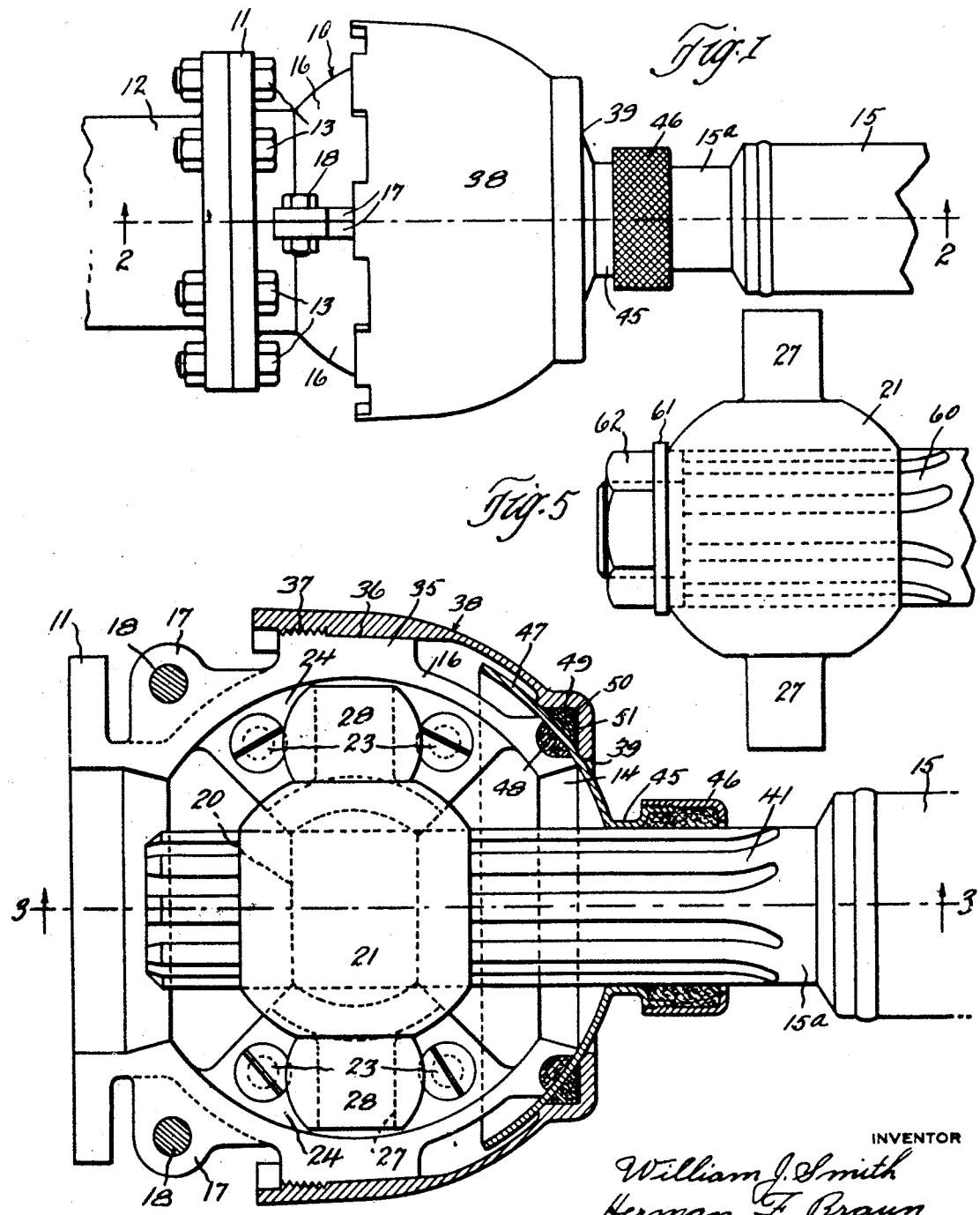
INVENTOR
William J. Smith
Herman F. Braun
BY Hull, Brock & West
ATTORNEY

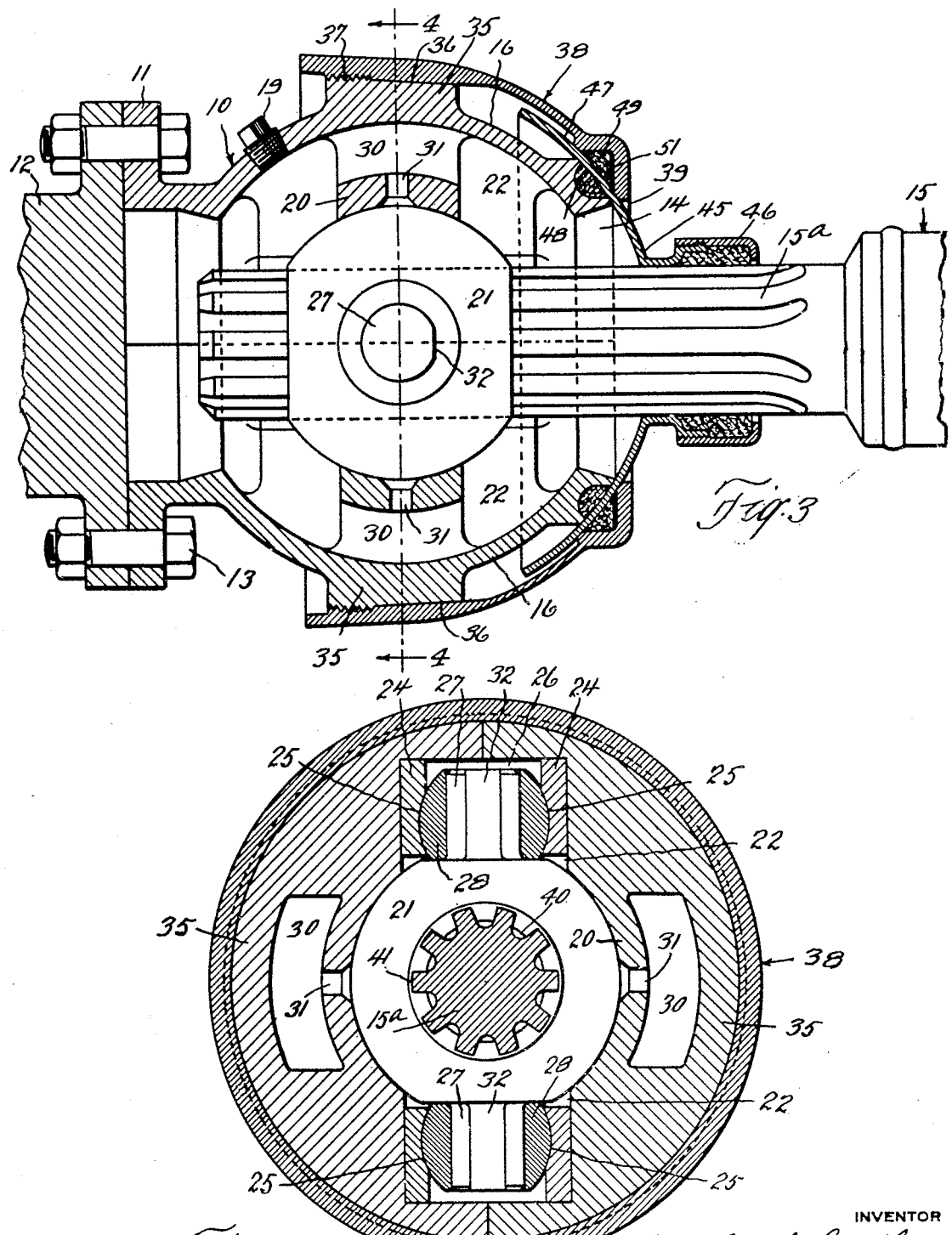

Patented Dec. 1, 1931

1,834,906

UNITED STATES PATENT OFFICE

WILLIAM J. SMITH AND HERMAN F. BRAUN, OF LAKEWOOD, OHIO, ASSIGNORS TO THE CLEVELAND STEEL PRODUCTS CORPORATION, OF CLEVELAND, OHIO, A CORPORATION OF OHIO

UNIVERSAL JOINT

Application filed February 27, 1929. Serial No. 343,218.

This invention relates to improvements in universal joints for transmitting power from one rotating member to another, and particularly to a universal joint for connecting the ends of shafts disposed at an angle to each other or between which there may be some angular movement as well as relative longitudinal movement in some cases.

The object of our invention is to provide a universal joint which may be readily assembled and disassembled and in which the parts subjected to wear are easily replaceable.

A further object is to provide a joint in which there may be longitudinal movement of the driving or driven shaft but in which there is no longitudinal movement of the trunnion block in its bearing.

A further object is to provide a universal joint which includes a lubricant reservoir about the moving parts and a lubricant retainer for the end of the housing into which the shaft passes.

With these and other objects in view which will be apparent from the description, the invention resides in all the novel features of construction and combination of parts herein disclosed and particularly pointed out in the appended claims.

In the accompanying drawings, Fig. 1 is a side view of the universal joint connecting two shafts; Fig. 2 is a longitudinal sectional view on the line 2—2 of Fig. 1; Fig. 3 is a longitudinal sectional view through the joint on the line 3—3 of Fig. 2; Fig. 4 is a sectional view on the line 4—4 of Fig. 3 and Fig. 5 is a detail view of the trunnion block with the shaft connected rigidly thereto.

In describing our invention reference is made to the accompanying drawings in which like reference numerals designate like parts in the several views.

The universal joint as illustrated comprises a housing 10 having at one end an attaching flange 11, by which the universal joint is connected to the flanged driving shaft 12 by bolts 13. The opposite end of the housing 10 is provided with an opening 14 through which the driven shaft 15 extends and in which it is free for angular movement.

The housing 10 is generally spherical in exterior contour and is split longitudinally so that it comprises two similar sections 16. At the flanged end each section 16 is provided with apertured ears 17 for the reception of bolts 18 by which the sections may be held in assembled relation. One section is provided with an opening through which lubricant may be injected, and which is normally closed by the screw plug 19.

Centrally located in each section 16 of the spherical housing 10 and integral therewith is a bearing block 20 provided with a concave seat. When the halves 16 are assembled the bearing blocks 20 are in opposed relation and form the top and bottom parts of a bearing in which a substantially spherical trunnion block 21 is free to pivot in any direction.

Extending laterally from the opposite sides of the bearing block 20 in each section as integral extensions thereof are bearing seats 22 the top surfaces of which are in the same plane extending longitudinally of the housing 10. The ends of these bearing seats extend radially outward from the concave bearing seat in the block 20 to the inner periphery of the housing 10. Secured on each bearing seat 22 by screws 23 are segmental bearing plates 24 each having in its top surface an arcuate groove 25 for the purpose hereinafter described.

When the sections 16 of the housing are assembled the bearing blocks 20 and integral extensions 22 constitute a web which extends laterally across the central part of the housing 10, in the center of which the substantially spherical trunnion block 21 is journaled and securely held from longitudinal movement relative to the housing. The bearing plates 24 of the two sections 16 when assembled are parallel with and spaced from each other and constitute the side walls of slots 26 which extend longitudinally through the web on diametrically opposite sides of the central bearing 20.

The substantially spherical trunnion block 21 which is journaled in the central bearing 20 is provided with two integral trunnions 27 which are diametrically disposed and which extend into the slots 26 in the web. Journaled on each trunnion 27 is a spherical roller 28 which fits closely between the bearing plates 24 in the grooves 25 and on which plates they bear to transmit the torque from the driving to the driven shaft when in operation. Extending through the center of the trunnion block 21 at right angles to the trunnions 27 is an internally splined bore 29 in which the splined end 15ª of the shaft 15 is received for limited longitudinal movement therein.

Through each bearing block 20 and affording communication from one end of the housing to the other is an opening 30 and from this opening to the face of the bearing 20 is a lubricant passage 31 through which the lubricant may find its way to the bearing surfaces of the trunnion block 21. Each trunnion 27 is provided with a flat side 32 which affords an opening between the trunnion and roller 28 for the entrance of the lubricant.

Around the center of the housing 10 is a circumferentially disposed integral flange portion 35, the outer periphery of which is provided with a slightly tapered seat 36 and screw threads 37.

Engaging over the outer end of the housing 10 is an internally threaded, one piece, substantially frusto-spherical shell 38 provided on its inner periphery with a tapered wedging seat which engages the tapered seat 36 as the shell 38 is screwed onto the threads 37 of the housing and securely clamps and rigidly holds the sections 16 together. The shell 38 constitutes the principal clamping means for holding the parts of the joint in assembled relation, the bolts 18 in the lug 17 being used chiefly for convenience in assembling the parts and may be dispensed with if desired. The outer end of the shell 38 has an aperture 39 concentric with the opening 14 in the housing through which the shaft 15 extends free for limited angular movement relative to the housing.

A lubricant retainer 45 which fits closely about the shaft 15 is provided at its outer end with a packing gland 46 filled with suitable packing to tightly seal the same to the shaft and at its inner end with a frusto-spherical portion 47 which fits about the casing 10 in the space between the casing and shell 38 where it is free for circumferential movement in any direction. About the opening 14 the casing is provided on its outer surface with a groove which receives a fiber packing gasket 48 against which the inner surface of the movable member 47 bears. The shell 38 on its inner surface is provided with an annular packing groove 49. A packing gasket 50 made of leather or cork fitting therein is pressed against the outer side of the shell 47 by a spring washer 51 interposed between the gasket 50 and the shell 38.

In operation with the flange 11 of the housing bolted to the driving shaft 12, the casing 10 is rotated therewith. With the trunnions 27 in the slots 26 the block 21 is forced to rotate with the housing and the torque is transmitted to the shaft 15 non-rotatably connected to said block in any position of angularity the shaft may assume within the limits of the opening 14 in the housing. The torque is always transmitted from the one member to the other on a line passing through the center of the bearing 20 in the housing 10 since there is no longitudinal movement of the trunnion block in the housing. By this construction an absolutely universal movement of the trunnion block is obtained when the shafts are rotating at an angle to each other without any radial or axial thrust on the same.

The housing 10 is comparatively large and when the joint is in use is filled with a lubricant so that all the parts having relative movement are constantly running in lubricant, the passages 30, 31 and 32 insuring its entrance between close fitting parts. The grease retainer 45 makes the housing oil tight while still permitting free angular and longitudinal movement of the shaft relative thereto, and is capable of withstanding the pressures normally used in the present day pressure lubricating devices generally used for introducing oil and greases into bearings.

In some cases it is not desirable to have the shaft 15 longitudinally movable in the trunnion block 21 in which case while the structure of the universal joint itself is not changed, the shaft 15 is provided with a short splined portion 60 (Fig. 5) with a reduced and threaded outer end. By means of the washer 61 and nut 62 the trunnion block is clamped tightly thereon.

When used at the ends of the propeller shaft in automobiles the propeller shaft is fixed in the trunnion block 21 of the rear universal joint in the manner disclosed in Fig. 5, and the opposite end is provided with a long splined portion and is free to move longitudinally in the trunnion block 21 of the front universal joint.

It is obvious that by removing only one half of the housing 10 when the device is assembled and connecting the propeller shaft to the transmission shaft of an automobile, the propeller shaft may be removed and any worn or broken parts readily replaced. Since all the torque is taken by the rollers 28 on the plates 24, these parts are subjected to the greatest amount of wear and when worn are readily replaced with little cost and the same joint will again be as free from play as a new joint. What little end thrust there is on the joint is taken by the trunnion block in the bearing 20. In automobiles this end thrust is negligible since the propeller shaft must be free for longitudinal movement as the rear axle moves on its springs relative to the frame.

The assembly and disassembly of the joint will be apparent to any mechanic and further explanation is not believed to be necessary.

In place of the shell 38 being screwed onto the casing 10, the threads 37 may be dispensed with and the shell pressed or fitted onto the casing. For convenience in repairing and disassembling, screw threading is preferred.

While we have mentioned that the gaskets 48 and 50 are of fiber, cork or leather, it is obvious that other packing may be used to answer the same purpose.

Having thus described our invention, what we claim is:

1. A universal joint comprising a housing having an opening at one end for the reception of a shaft and means at the opposite end for securing it to a rotatable member, a substantially spherical bearing in said housing and rigid therewith, said housing having axially disposed slots extending radially outward from and on diametrically opposite sides of said spherical bearing, a trunnion block having spherical portions journaled in said spherical bearing for rotational movement only, diametrically opposite trunnions on said trunnion block received in said slots for arcuate movement longitudinally therein, said trunnion block being provided with a socket for receiving the end of a shaft and means for engaging said shaft to prevent relative rotation while permitting longitudinal movement of the shaft therein.

2. A universal joint comprising a housing split longitudinally to provide separable sections, said sections provided on their inner surface with bearing blocks rigid therewith, forming a bearing when the sections are assembled, a trunnion block journaled in said bearing having diametrically opposite trunnions, said housing having axially disposed slots extending radially outward from said bearing in which said trunnions are received, and means for securing said sections together including a ring shaped member tightly engaging the outer periphery of said housing.

3. A universal joint comprising a housing split longitudinally to provide separable sections, said sections provided on their inner surface with bearing blocks rigid therewith, forming a bearing when the sections are assembled, a trunnion block journaled in said bearing having diametrically opposite trunnions, said housing having axially disposed slots extending radially outward from said bearing in which said trunnions are received, and means for securing said sections together including a circumferential wedging surface on the outer periphery of said housing, a ring-like member having a wedging surface encircling and forced tightly on the wedging surface of said housing.

4. A universal joint comprising a housing split longitudinally to provide separable sections, said sections provided on their inner surface with bearing blocks rigid therewith, forming a bearing when the sections are assembled, a trunnion block journaled in said bearing having diametrically opposite trunnions, said housing having axially disposed slots extending radially outward from said bearing in which said trunnions are received, said housing having a circular exterior portion provided with a clamping surface and a threaded portion, an internally threaded ring member having a portion engaging said clamping surface, whereby when the ring is screwed tightly on said threaded portion, the sections of said housing are securely clamped together.

5. A universal joint comprising a housing having an opening at one end for receiving one end of a shaft, and means at the opposite end for securing it to a rotatable member, a trunnion block journaled in said housing and means for connecting the same to the above mentioned shaft, trunnions on said block engaging said housing, said housing having a spherical exterior portion concentric with the above mentioned end opening, a lubricant retainer having an opening through which said shaft may extend, means for sealing said retainer on said shaft, and a frusto-spherical portion engaging the spherical portion on said housing, a ring member secured to the outer periphery of said housing and having an annular portion engaging the outer side of said retainer for holding it snugly against said housing, the spherical portion of said housing having a circumferential packing groove, packing in said groove, the annular portion of said member having a packing groove circumferentially arranged on its inner periphery, a packing ring in said groove, and a resilient washer interposed between the bottom of the groove and said packing ring for urging said packing against the outer periphery of said lubricant retainer.

6. A universal joint for shafts including a housing split axially to provide separable sections, a ring like member engaging the outer periphery of said sections for clamping them together, said sections being provided with concave bearing blocks forming when the sections are assembled a substantially spherical bearing, axially extending slots in said housing on diametrically opposite sides of said spherical bearing, a trunnion block having spherical portions journaled in said spherical bearing, trunnions on said block extending into said slots, and means for securing said trunnion block non-rotatably to a shaft, said housing and ring-like member being provided with complementary, cooperating, threaded and tapered portions whereby the ring-like member may be threaded in tight clamping relation upon the housing.

7. A universal joint comprising a housing split longitudinally to provide separable sections, said sections provided on their inner surface with bearing blocks rigid therewith, forming a bearing when the sections are assembled, a trunnion block journaled in said bearing having diametrically opposite trunnions, said housing having axially disposed slots extending radially outward from said bearing in which said trunnions are received, said housing having a circular exterior portion provided with a tapered clamping surface and a threaded portion, an internally threaded ring member having a portion corresponding to and engaging said clamping surface, whereby when the ring is screwed tightly on said threaded portion, the sections of said housing are securely clamped together.

In testimony whereof, we hereunto affix our signatures.

WILLIAM J. SMITH.
HERMAN F. BRAUN.